Sept. 27, 1960 T. YEADON 2,953,925

FLUID MASS GYROSCOPE

Filed March 13, 1959 2 Sheets-Sheet 1

INVENTOR
TOM YEADON

BY *Lester S. Hecht*
LESTER S. HECHT
ATTORNEY

Sept. 27, 1960          T. YEADON          2,953,925
FLUID MASS GYROSCOPE
Filed March 13, 1959          2 Sheets-Sheet 2
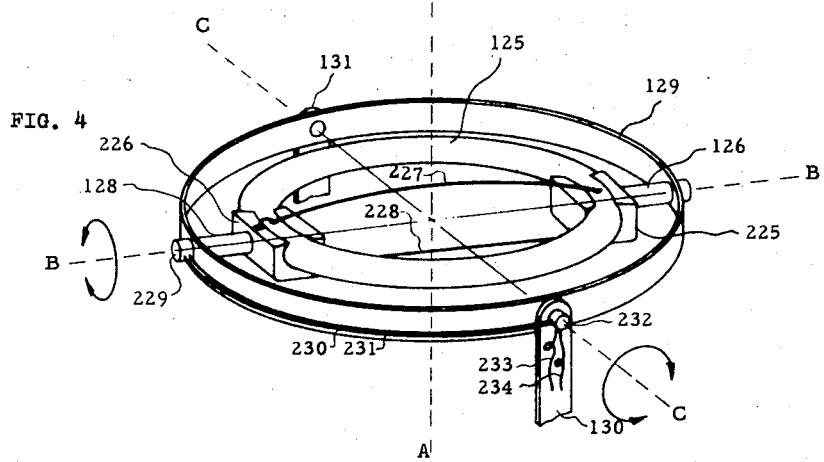
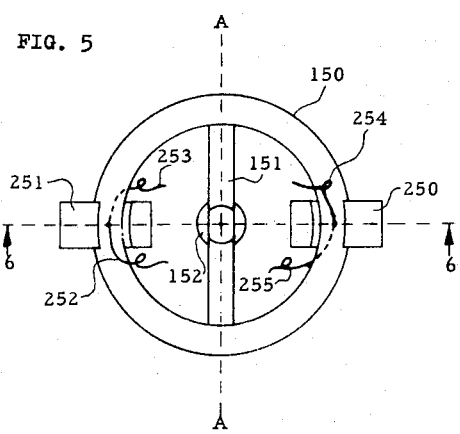
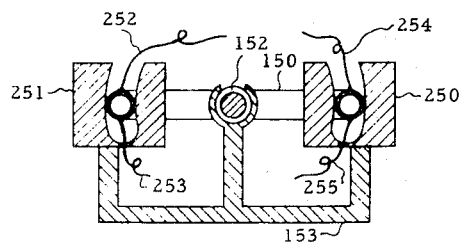
INVENTOR.
TOM YEADON
BY
LESTER S. HECHT United States Patent Office 2,953,925
Patented Sept. 27, 1960

2,953,925

FLUID MASS GYROSCOPE

Thomas Yeadon, 6208 Radford, North Hollywood, Calif.

Filed Mar. 13, 1959, Ser. No. 799,168

8 Claims. (Cl. 74—5.7)

This invention relates to a fluid-mass gyroscope and, more particularly, to a gyroscope wherein the effect of a rotating mass is accomplished by driving a fluid, such as mercury, around an annular raceway by means of the interaction of electromagnetic flux and electric current.

Gyroscopes have been used in many diverse applications, ranging from delicate aircraft instruments to large gyroscopic grinding mills and ocean liner stabilizers. As will be evident from the detailed discussion which follows, the present invention may be used in any of these applications. However, for the purpose of preliminary explanatory discussion and because of the particular advantages of the invention as employed in delicate miniaturized instruments such as are found in aircraft, the discussion of the prior art which follows will be limited to gyroscopes found in or associated with aircraft instruments.

Conventional gyroscopes as presently employed in aircraft applications have many disadvantages. Several of these are discussed in a book entitled "The Gyroscope and Its Applications," published in March of 1946 by Martin Davidson. On pages 146 and 147 the author says; "At normal temperature and atmospheric pressure the effect of mechanical imperfections, on commercial gyroscopes, is approximately equal to the sum of the effects of earth's rotation and the speed of the aircraft. However, if we include variations of temperature and atmospheric pressure as mechanical imperfections the latter become more serious. The effect of temperature and pressure variations is to change the rotary speed and, in most cases, the expansion caused by temperature change will displace the center of gravity of the gyro. The magnitude of precessional errors depends on whether attempts have been made in the design to maintain a constant rotor speed and to provide temperature compensation. Random precessional errors are always present because of wear of bearings and the inevitable damage of the delicate parts which are an unavoidable feature of all gyroscopes."

In another book entitled "Aircraft Gyroscopic Flight Instruments," published in March of 1952, the author says on page 13: "Whatever the function of a gyroscopic instrument, any torque due to bearing friction, or errors in the balance, will tend to precess the gyro, and it is highly important that this friction and out of balance be reduced to a minimum. Therefore very special attention is necessary during the manufacture and assembly of these gyroscopic instruments. It is also important that the equipment is not subjected to any harsh jars or excessive vibration; otherwise the bearings will deteriorate rapidly, causing the equipment to give erroneous indications; for this reason the instruments must always be mounted on a shock-proof panel. For accurate results the shock-proof panel should be so mounted that the amplitude of vibration at the instruments does not exceed 4/1000 of an inch."

In recent years the problems mentioned by the authors of the above-mentioned books have become increasingly acute with the growing speed, vibration, and extremes of temperature found in contemporary manned aircraft. These problems are even more acute in missile and rocket systems.

One specific disadvantage of prior art gyroscopes is related to the radius of gyration of the gyroscopic element, which is the effective distance of a rotating mass from its axis of rotation. The amount of gyroscopic inertia developed by a rotating mass depends jointly on the amount of mass, the radius of gyration, and the speed of rotation. An increase in any of these three quantities increases the gyroscopic inertia, while a decrease in any of the three decreases the gyroscopic inertia. The radius of gyration is particularly important because the gyroscopic inertia varies as its square.

In airborne applications, where space and weight are at a premium, it is desirable to keep the amount of rotating mass to a minimum and also to keep the radius of the rotating mass to a minimum. These requirements make it very difficult to achieve the large gyroscopic inertia needed for accurate measurements since an increase of speed in the conventional system necessitates an increase in the supporting structure for the rotating mass, which in turn decreases the radius of gyration and thus decreases the gyroscopic inertia.

As a result, the conventional gyroscopic measuring instruments which are miniaturized frequently are lacking in accuracy or in reliability due to the excessive wear upon the bearings and supports at the high rotational speeds required. Furthermore, as the size of the conventional gyroscope is reduced and the speed of rotation is increased to maintain the necessary accuracy it becomes increasingly difficult to manufacture supports with the strength and precision desired. In addition, miniaturized bearings and supports are extremely susceptible to damage due to shock and vibration.

Another specific disadvantage of prior art gyroscopes relates to the method of driving the rotating mass. Most airborne gyroscopes are driven by an electric motor coupled to the axle of the flywheel, and any vibration due to the electric motor is thus connected directly to the rotating mass. Therefore, the vibration and inaccuracies inherent in small high speed electric motors also acts as a limitation on the accuracy of the gyroscope.

Yet another specific disadvantage of prior art gyroscopes relates to the method of mounting the rotating mass for movement about an axis at right angles to the axis of rotation. The gyroscope's axis of movement must pass through the center of the flywheel, and since it is impractical to attach pivots to the rim of a rotating flywheel, it is necessary to elongate the axle of the flywheel and support it on a gimbal ring larger in diameter than the flywheel, and pivot the gimbal ring at points near the rim of the flywheel. In the case of a rate gyro, which is a gyroscope having only one axis of movement at right angles to its axis of rotation, the gimbal ring mounting requires a spherical volume larger in diameter than the flywheel, even though the effective gyroscopic mass is contained only in a narrow portion in the center of this spherical volume.

The above described disadvantages of prior art gyroscopes have long been considered to be unavoidable because it has been believed that solid rotating masses must be used to generate gyroscopic inertia. This belief is so strongly held that the author of a recent text, "The Gyroscope, Theory and Applications," published in 1958, defines a gyroscope on page 37 of that text in the following words: "A gyroscope may be broadly defined as a *solid* body capable of rotating at high angular velocity about an instantaneous axis which always passes through a fixed point." (Emphasis added.)

In accordance with this invention it has been discovered that the disadvantages previously considered inherent in gyroscopes can be overcome by using a fluid material as the gyroscopic element, and driving the fluid material around an annular raceway. Thus this invention completely eliminates the inaccuracy, delicacy, and unreliability due to bearings by removing the need for bearings as supports for the rotating mass. Furthermore, inaccuracy and wear due to unbalance in the flywheel and motor armature is avoided by the use of a fluid driven by the interaction of electromagnetic flux and electric current. It provides a maximum radius of gyration, and renders radius of gyration independent of rotary speed by completely eliminating the need for central support of the flywheel. And it further eliminates a gimbal mounting ring by providing a pivot point on the rim of the flywheel.

Accordingly, one object of this invention is to provide a gyroscope more accurate than any heretofore known in the art. Another object of the invention is to provide a gyroscope more rugged than any theretofore known in the art. Yet another object of this invention is to provide a gyroscope lighter in weight and more compact in volume than any heretofore known in the art. Still another object of the invention is to provide a gyroscope more reliable in operation than any heretofore known in the art. A further object of the invention is to provide a gyroscope more convenient in manufacture or maintainence than any heretofore known in the art. Another object of the invention is to provide a gyroscope lower in cost than any heretofore known in the art. An additional object of the invention is to provide a gyroscope having a useful life longer than any heretofore known in the art. Another object of the invention is to provide a gyroscope simultaneously possessing all of the above noted advantages. Additional objects and advantages of the invention will be apparent to those skilled in the art from the following description of several specific embodiments thereof, in connection with the attached drawings, in which:

Figure 1:
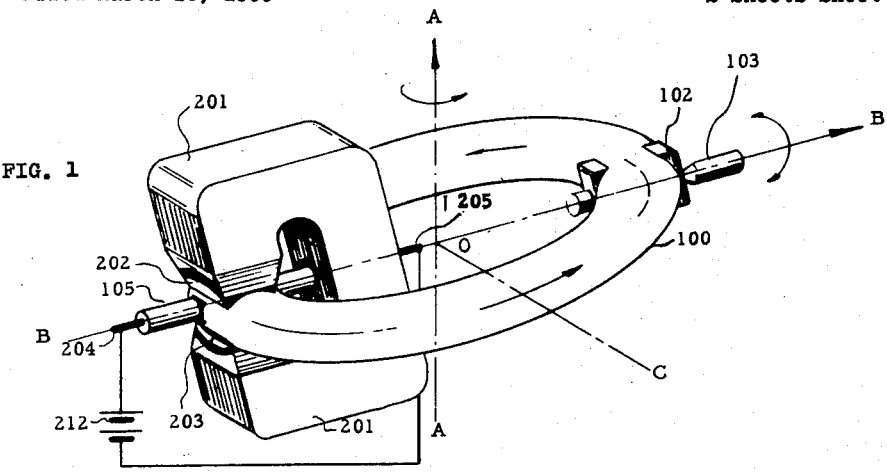
Fig. 1 is a perspective disclosing one embodiment of the invention.
Figure 2:
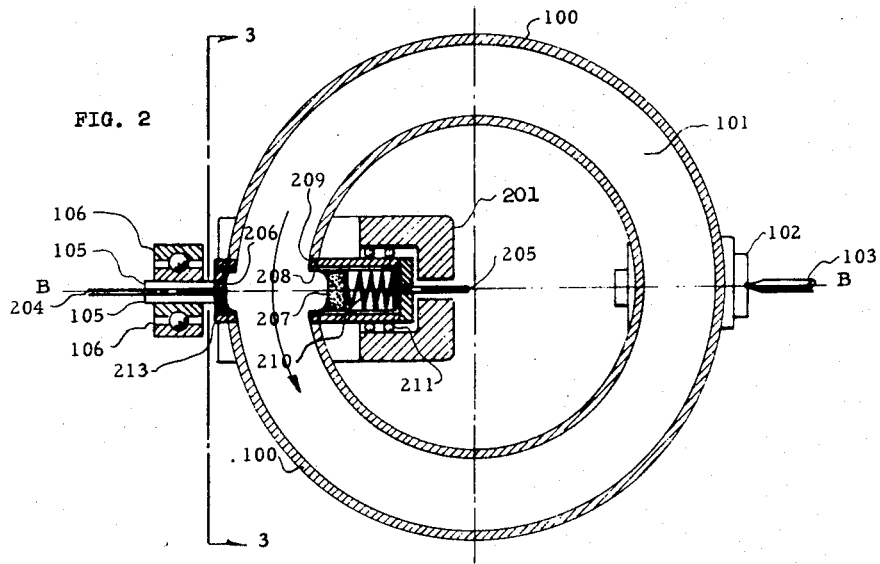
Fig. 2 is a plan section taken through the central plane of the embodiment disclosed in Fig. 1.
Figure 3:
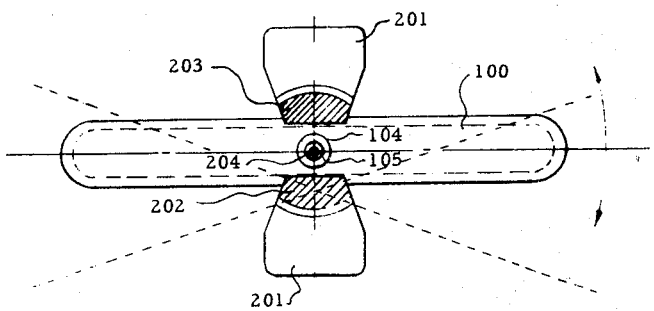
Fig. 3 is an elevation view of the embodiment disclosed in Fig. 1.

Fig. 4 discloses a second embodiment of the invention;

Fig. 5 discloses a third embodiment of the invention;

Fig. 6 is an elevation section taken on the line 6—6 of Fig. 5;

Figs. 1, 2, and 3 disclose one embodiment of the invention which is adapted for movement through a limited arc about one axis perpendicular to the axis of rotation of the gyroscopic mass. A closed annular raceway 100 is pivoted to a supporting structure, not shown, by means of bearing block 102, bearing pivot 103, shaft 105, and bearings 106. Pivot 103 and bearing 106 are attached to the supporting structure, not shown, and bearing block 102 and shaft 105 are attached to the raceway 100. A fluid electrically conductive material 101 is contained inside raceway 100, and driven therearound by an electric motor circuit containing a permanent magnet and a direct current source. A permanent magnet 201 is rigidly attached to the supporting structure, not shown, such that the magnetic field therefrom extends through a portion or raceway 100 and fluid material 101 contained therein. Pole pieces 203 and 202 are rigidly attached to the raceway near the poles of magnet 201, as best illustrated in Fig. 3. Pole pieces 202 and 203 have cylindrical surfaces facing cylindrical surfaces at the pole ends of magnet 201. The pole pieces are separated from the magnet pole ends by a small air gap which permits rotation of the raceway 100 around axis BB through an angle of approximately 30 degrees above or below axis OC.

Two opposing electrical contacts, 206 and 207, contact the fluid material 101 within the magnetic field of magnet 201. When a voltage is applied between contacts 206 and 207, a current flows through electrically conductive material 101 at right angles to the magnetic field of magnet 201. This current flow produces a force acting to drive the fluid material around the raceway in accordance with the well known principle of direct current motors.

In response to this force the fluid material is driven around the closed raceway, the direction of movement depending on the direction of the magnetic field and the electric current, as well known to those skilled in the art. Current is driven between the two opposing contacts 206 and 207 by means of a direct current source 212 which is connected to the contacts through conductors 204 and 205.

Contacts 206 and 207 are slightly recessed from the inner walls of the raceway 100 to avoid obstructing the flow of mercury therearound. Contact 207 is movable in a cylindrical container 208 and spring loaded toward the other contact in order to maintain pressure on the fluid trapped in the depressions, thus providing positive contact between the fluid and the contacts. Cylindrical container 208 is rigidly attached to a non-conducting cylindrical container 209, which is journaled through bearings 211 to an opening cut in permanent magnet 201, which is bored to allow passage of conductor 205. The other contact, 206, is rigidly attached to a non-conducting plug 213 which supports a shaft 105. Shaft 105 has a central opening to admit passage of conductor 204.

The operation of this embodiment is as follows: the supporting structure, not shown—to which magnet 201, bearings 106, and bearing pivot 103 are attached—is rigidly mounted to some body whose rate of turn about axis OC is to be measured.

Any movement of the body around axis OC will cause a forced precession of the gyroscope about axis OC, and will result in the development of a torque about axis BB proportional to the rate of movement about axis OC. The amount of torque developed by the annular raceway about axis BB will therefore be a measure of the rate of turn about axis OC. The torque about axis BB is measured by torque measuring means, not shown. The torque measuring means, which is well known to those skilled in the art, also includes means restraining the movement of annular raceway 100 within the limits set by the magnet 201, as indicated by the diagonal dashed lines on Fig. 3. Any suitable torque measuring and restraining means may be employed without altering the fundamental operation of the invention.

In Fig. 4 a second embodiment of the invention is shown which is mounted for 360 degrees rotation about two axes mutually perpendicular to each other and to the axis of the rotating mass. In this embodiment, an annular raceway 125 is rigidly attached to two magnets 225 and 226, which are journaled about axis BB to gimbal ring 129 through shafts 126 and 128. Gimbal ring 129 is journaled to fixed supports 130 and 131 on axis CC. The rotating mass is driven around the raceway about axis AA; the raceway and magnet assembly is rotatable about axis BB, which is perpendicular to axis AA; and the raceway magnet and gimbal ring assembly is rotatable about axis CC, which is perpendicular to both axis AA and axis BB.

The magnetic field of magnets 226 and 225 extend parallel to axis BB, and two pairs of opposing electrical contacts are employed in contact with an electrically conductive fluid material contained within annular raceway 125. The axis of each pair of opposing electrical contacts is perpendicular to the magnetic field of its corresponding magnet. The electrical contacts are connected through conductors 227 and 228 to a slip ring and brush assembly 229, thence through conductors 230 and 231 to a second slip ring and brush assembly 232, which is joined by conductors 233 and 234 to a source of voltage. Application of voltage between conductors 233 and 234 drives a direct current between both pairs of opposed electrical contacts, and produces two forces driving the fluid material around the raceway.

A third embodiment of the invention is shown in Fig. 5. This embodiment utilizes a central supporting member, and is adapted for limited rotation about two axes perpendicular to each other and perpendicular to the axis of rotation of the gyroscopic mass. An annular raceway 150 is rigidly attached to a central member 151, which is journaled about axis A—A and axis 6—6 to a base 153 by means of a ball and socket joint 152. Magnets 250 and 251 are supported by base 153 transverse of the central member 151. Magnets 250 and 251 have semispherical openings cut therein to receive a portion of annular raceway 150 and to allow movement thereof in a limited arc about axis A—A and axis 6—6, as best shown in Fig. 6. The magnetic field from magnets 250 and 251 is parallel to axis 6—6, and two pairs of opposed electrical contacts are mounted within the raceway within the field of a corresponding magnet, the axis of each pair of electrical contacts being perpendicular to the field of the corresponding magnet. Electrical conductors 252, 253, 254, and 255 connect the opposing electrical contacts with a source of voltage not shown. Each contact makes electrical contact with an electrically conductive material contained in raceway 150, and when current is passed between the contacts the fluid material is driven around the raceway in the manner previously described.

From the foregoing description it will be apparent that this invention provides a novel gyroscope which completely eliminates inaccuracies, delicacy, unreliability, and other disadvantages associated with conventional gyroscopes. By employing a fluid rotating mass the invention makes possible gyroscopes more accurate, more compact, more rugged, and more convenient in construction and maintenance than any heretofore known in the art. And although the advantages of the invention are most important in missile and rocket gyroscopes, they are equally applicable to any device employing gyroscopic principles.

It should be understood that many modifications may be made in the specific structure disclosed without departing from the spirit of this invention. For example, instead of using a direct current motor for driving the fluid mass, an induction motor may be used wherein a rotating field drags the fluid mass around the raceway in the manner of a squirrel cage rotor. In this case, a fluid containing magnetic material in suspension might be used instead of the electrically conducting material disclosed. Many different mounting systems may be devised for supporting the annular raceway which is basic to the invention. This invention includes all modifications falling within the scope of the following claims.

I claim:

1. A gyroscope comprising a supporting structure, a gimbal ring journaled to the supporting structure about a first journal axis, an annular raceway journaled within said gimbal ring, the annular raceway journaled to the gimbal ring about a second journal axis, a fluid electrically conductive material within the annular raceway, two magnets rigidly attached to the annular raceway, the magnets located near the pivot points of the second journal axis and the magnetic field thereof parallel with the second journal axis, two pairs of opposing electrical contacts in contact with said electrically conductive material, each pair of opposing electrical contacts within the magnetic field of a corresponding magnet and the axis of each pair of opposing electrical contacts perpendicular to the field of the corresponding magnet, and electrical conductor means for connecting said two pairs of opposing electrical contacts to a source of voltage mounted on said supporting structure.

2. A gyroscope as defined in claim 1, wherein said electrical conductor means comprises a first brush and slip ring assembly connecting between the annular raceway and the gimbal ring, a second brush and slip ring assembly connecting between the gimbal ring and the supporting structure, electrical conductors connecting between the two pairs of opposed electrical contacts and the first slip ring and brush assembly, electrical conductors connecting between the first slip ring and brush assembly and the second slip ring and brush assembly, and electrical conductors attached to the second slip ring and brush assembly and adapted for connection to a source of voltage mounted on the supporting structure.

3. A gyroscope comprising a closed annular raceway, a rigid central member attached to and extending across the center of said annular raceway, said rigid central member attached at the center thereof to a supporting structure, the attachment between said rigid central member and said supporting structure being adapted such that said annular raceway is rotatable relative to said supporting structure about the axis of said rigid central member and about a second axis perpendicular to the axis of said rigid central member, said second axis lying within the plane of said annular raceway and passing through the center thereof; a magnet attached to said supporting structure, said magnet having a generally semi-spherical opening cut therein to receive a portion of said annular raceway and to permit rotation of said annular raceway about said two axes, and said magnet being mounted to normally engage a portion of said raceway in said opening cut therein; an electrically conductive fluid material within said annular raceway; a pair of axially opposed electrical contacts within the portion of said annular raceway engaged in said opening cut in said magnet, each of said electrical contacts being in contact with said electrically conductive fluid material contained within said annular raceway, the axis of said opposed electrical contacts perpendicular to the lines of force of said magnet, and means for applying a voltage across said pair of opposed electrical contacts.

4. A gyroscope comprising a closed annular raceway journaled to a supporting structure for rotation around a first axis within the plane of said annular raceway and passing through the center thereof, a relatively heavy fluid material within said annular raceway, said fluid material being electrically conductive and the inner surface of said closed annular raceway being insulated, a pair of electrical contacts within the raceway making electrical contact with said fluid material, each of said electrical contacts being concentric with said first axis and being located on opposing sides of the inner surface of said raceway; means for generating a magnetic field through said fluid between said electrical contacts, said magnetic field being perpendicular to the plane of said annular raceway, current conductor means coupled to said electrical contacts and extending from said electrical contacts to said supporting structure via the journal connection between said annular raceway and said supporting structure, and a source of voltage coupled to said current conductors to drive current through said fluid material between said electrical contacts, whereby said fluid material is driven around said annular raceway.

5. The combination defined in claim 4 wherein said annular raceway is journaled to said supporting structure by two bearing assemblies connecting between said raceway and said supporting structure at diametrically opposing points on the periphery of said raceway, and wherein said current conductor means includes a brush-slip ring assembly concentric with one of said bearing assemblies.

6. The combination defined in claim 5 wherein said supporting structure comprises a gimbal ring larger in diameter than said annular raceway, and wherein said gimbal ring is journaled to a base structure for rotation around a second axis within the plane of said annular raceway perpendicular to said first axis by means of two bearing assemblies connecting between said gimbal ring and said base structure at diametrically opposing points on the periphery of said gimbal ring, and wherein said current conductor means includes a second brush-slip ring assembly concentric with one of said gimbal bearing assemblies.

7. The combination defined in claim 6 wherein said magnetic field is generated by a magnet assembly rigidly attached to said annular raceway adjacent to said electrical contacts.

8. The combination defined in claim 7, and also including a second pair of electrical contacts within the annular raceway making electrical contact with the fluid material therein, said second pair of electrical contacts being concentric with said first axis and being located on opposing sides of the inner surface of said raceway, said second pair of electrical contacts being diametrically opposed to the first mentioned pair of electrical contacts relative to the center of said annular raceway, said second pair of electrical contacts being connected in parallel with said first mentioned pair of electrical contacts, and a second magnet assembly rigidly attached to said annular raceway adjacent to said second pair of electrical contacts, said second magnet assembly being adapted to generate a second magnetic field through said fluid between said second pair of electrical contacts and said second magnetic field being perpendicular to the plane of said annular raceway.

References Cited in the file of this patent

UNITED STATES PATENTS

| | | |
|---|---|---|
| 1,841,606 | Kollsman | Jan. 19, 1932 |
| 2,652,778 | Crever | Sept. 22, 1953 |
| 2,753,469 | Statham | July 3, 1956 |
| 2,856,142 | Haviland | Oct. 14, 1958 |
| 2,871,703 | Walker | Feb. 3, 1959 |